(12) United States Patent
Brundage

(10) Patent No.: US 11,112,053 B2
(45) Date of Patent: Sep. 7, 2021

(54) HOSE LINER

(71) Applicant: Brenda Brundage, Ogden, UT (US)

(72) Inventor: Brenda Brundage, Ogden, UT (US)

( * ) Notice: Subject to any disclaimer, the term of this patent is extended or adjusted under 35 U.S.C. 154(b) by 38 days.

(21) Appl. No.: 16/245,050

(22) Filed: Jan. 10, 2019

(65) Prior Publication Data
US 2019/0211961 A1 Jul. 11, 2019

Related U.S. Application Data

(60) Provisional application No. 62/615,601, filed on Jan. 10, 2018.

(51) Int. Cl.
*F16L 55/18* (2006.01)
*F16L 58/10* (2006.01)
*E03F 1/00* (2006.01)

(52) U.S. Cl.
CPC .......... *F16L 58/1018* (2013.01); *E03F 1/008* (2013.01)

(58) Field of Classification Search
CPC ........ E03F 3/06; E03F 1/008; E03F 2003/065
USPC ................. 138/97, 98, 104; 405/184.2, 150.1
See application file for complete search history.

(56) References Cited

U.S. PATENT DOCUMENTS

| | | | | |
|---|---|---|---|---|
| 3,087,515 A * | 4/1963 | Venable, Jr. | ............ | F16L 58/06 138/145 |
| 4,191,493 A * | 3/1980 | Hansson | ............... | E21B 33/127 156/294 |
| 4,643,229 A * | 2/1987 | Hickin | ............... | B60R 15/00 138/109 |
| 4,723,579 A * | 2/1988 | Hyodo | .................. | B29C 63/343 138/119 |
| 5,919,002 A * | 7/1999 | Ramp | ....................... | E03F 3/06 405/156 |
| 6,170,531 B1 * | 1/2001 | Jung | .......................... | B32B 5/06 138/98 |
| 6,983,767 B2 * | 1/2006 | Rickards | .................. | F16L 57/00 138/104 |
| 7,018,691 B2 * | 3/2006 | McNeil | ............... | F16L 55/1656 138/98 |
| 7,819,139 B2 * | 10/2010 | Woods | ....................... | G01F 1/58 138/109 |
| 8,256,468 B1 * | 9/2012 | Frew | .................... | F16L 55/1654 138/97 |
| 9,587,781 B1 * | 3/2017 | Abdulghafoor | ....... | F16L 55/165 |
| 10,584,472 B2 | 3/2020 | Jeffrey | | |
| 2006/0225802 A1 * | 10/2006 | Kamiyama | ......... | F16L 55/1656 138/98 |
| 2012/0193011 A1 * | 8/2012 | D'Hulster | ........... | F16L 55/1651 156/95 |

(Continued)

*Primary Examiner* — James F Hook
(74) *Attorney, Agent, or Firm* — Workman Nydegger

(57) ABSTRACT

A hose liner is provided for preventing contamination of a hose. The liner includes an intermediate section with a passageway therethrough. The intermediate section extends through the length of the hose to line an interior surface of the hose. The liner also includes a first end section extending from a first end of the intermediate section. The first end section includes an opening and a securing mechanism for selectively securing the first end section to a first end of the hose. The line also includes a second end section extending from a second end of the intermediate section. The second end section includes an opening and a securing mechanism for selectively securing the second end section to a second end of the hose.

20 Claims, 3 Drawing Sheets

(56) References Cited

U.S. PATENT DOCUMENTS

2013/0284299 A1* 10/2013 Schooley ............... F16L 55/00
                                                      138/104
2014/0311607 A1* 10/2014 Mathey ............... F16L 55/1651
                                                       138/98
2020/0208391 A1    7/2020 Jeffrey

* cited by examiner

HOSE LINER

CROSS-REFERENCE TO RELATED APPLICATIONS

This application claims priority to and the benefit of U.S. Provisional Application No. 62/615,601, filed Jan. 10, 2018, and entitled Hose Liner, which is incorporated herein by reference in its entirety.

BACKGROUND

1. Technical Field

The present disclosure relates generally to sewage removal systems for mobile vehicles. More particularly, the present disclosure relates to liners for drain hoses for quickly and sanitarily allowing for waste disposal and stowage of drain hoses.

2. Background and Relevant Art

Large, motorized recreational vehicles and towable travel trailers (collectively "RV's"), have become a popular mode of travel. RV's allow a person to travel in comfort without requiring prior arrangement of hotel reservations. An RV traveler needs only to locate an RV trailer park or campground, drive in and park, setup the RV, and relax for the evening. Luggage and other belongings do not need to be carried into or out of a motel room each time the traveler moves to a new location. An RV is effectively a self-contained "home on wheels." As such, an RV typically includes its own onboard toilet system, including an associated sewage holding tank.

Since the key feature of an RV is its mobility, the size of an onboard sewage holding tank is necessarily limited to avoid placing too sizable a load on the RV that would substantially detract from the fuel efficiency of the RV. Hence, while traveling or periodically camping, arrangements need to be made to dispose of accumulated sewage. To that end, an RV's holding tank is equipped with a discharge or outlet pipe extending out of the bottom of the holding tank.

Sewage is typically disposed of at an appropriate stationary waste disposal site at a truck stop, gas station, or campground. These sites typically provide a vertical threaded tubular riser or inlet tube through which the accumulated sewage may be dumped into the stationary waste disposal site or sewer. Typically, a free end of a drain or sewage hose connected to the outlet pipe on the RV sewage holding tank is inserted into the interior of the riser. The accumulated sewage is released from the tank, and travels through the sewage hose into the in-ground stationary disposal site.

This disposal method forces the party disposing of sewage to deal with a sewage hose that must be thoroughly washed off and disinfected to avoid inadvertent peripheral contamination by raw sewage. The washing and disinfection process may also cause raw sewage to be inadvertently strewn about the waste disposal site. Moreover, because sewage hoses are typically corrugated (to allow the hose to stretch and bend without crimping), there is a high likelihood that raw sewage may be trapped in the corrugations of the hose despite efforts to wash the hose. The raw sewage and bacteria therefrom may spread from the hose to surrounding areas, including into the RV when the contaminated drain hose is stored between disposals.

Accordingly, a need exists for an RV sewage removal system that can quickly and sanitarily allow for waste disposal and stowage of drain hoses.

BRIEF SUMMARY

Implementations of the present disclosure include apparatuses and methods that aid in disposing of raw waste in a simple and sanitary manner. In particular, implementations of the present disclosure relate to liners for drain hoses used in connection with draining RV sewage tanks and related methods.

For example, in one embodiment a hose liner includes an intermediate section having a passageway therethrough. The intermediate section is configured to extend through the length of a hose to line an interior surface of the hose. The liner includes a first end section that extends from a first end of the intermediate section. The first end section includes an opening and a securing mechanism for selectively securing the first end section to a first end of the hose. The liner also includes a second end section that extends from a second end of the intermediate section. The second end section includes an opening and a securing mechanism for selectively securing the second end section to a second end of the hose.

A method according to the present disclosure includes inserting a liner through a drain hose such that an intermediate section of the liner is disposed within a passageway of the drain hose and first and second end sections of the liner extend from openings in the ends of the drain hose. The method also includes inverting or folding the first and second end sections back over the first and second ends of the drain hose and securing the first end sections to an exterior surface of the drain hose with the securing mechanisms.

According to another embodiment, a waste disposal kit includes a hose and one or more hose liners for preventing contamination of the hose. The hose has an open first end, an open second end, and a conduit extending therethrough between the first end and the second end. Each of the one or more hose liners includes an intermediate section, a first end section, and a second end section. The intermediate section has a passageway therethrough and can extend through the length of the hose to line an interior surface of the hose. The first end section extends from a first end of the intermediate section. The first end section includes an opening and a securing mechanism for selectively securing the first end section to the first end of the hose. The second end section extends from a second end of the intermediate section. The second end section includes an opening and a securing mechanism for selectively securing the second end section to the second end of the hose.

Additional features and advantages of exemplary implementations of the disclosure will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above recited and other advantages and features of the disclosure can be obtained, a more particular description of the disclosure briefly described above will be rendered by reference to specific embodiments thereof, which are illustrated in the appended drawings. It is appreciated that these drawings depict only typical embodiments of the disclosure and are not therefore to be considered to be limiting of its scope. The disclosure will be described and explained with additional specificity and detail through the use of the accompanying drawings in which.

DETAILED DESCRIPTION

Figure 1:
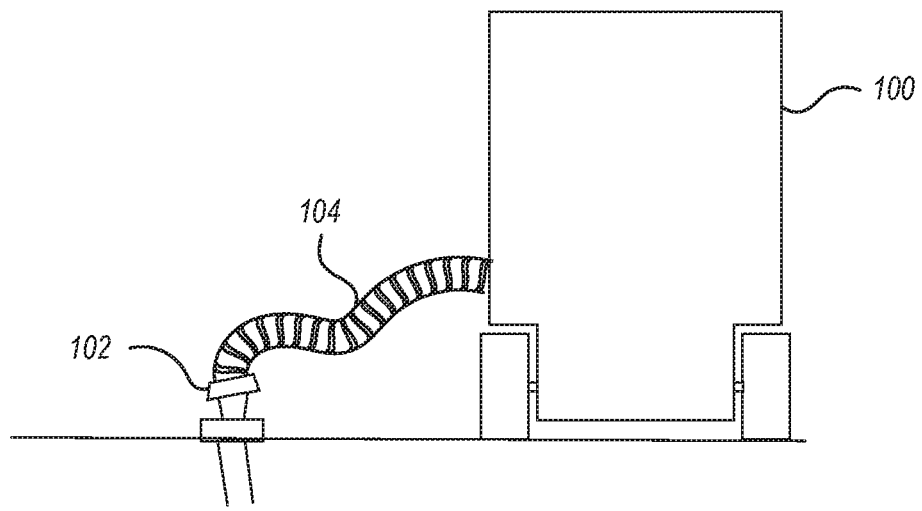
FIG. 1 illustrates a schematic representation of a drain system in use, connected between an RV and a waste disposal site.

In the following detailed description, reference is made to the accompanying drawings, which form a part hereof. In the drawings, similar symbols typically identify similar components, unless context dictates otherwise. The embodiments in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and as illustrated in the figures, can be arranged, substituted, combined, separated, and designed in a wide variety of different configurations, all of which are explicitly contemplated herein. It will also be understood that any reference to a first, second, etc. element in the claims or in the detailed description is not meant to imply numerical sequence but is meant to distinguish one element from another unless explicitly noted as implying numerical sequence.

The present disclosure relates to sewage removal systems for mobile vehicles and, more particularly, to liners for drain hoses for quickly and sanitarily allowing for waste disposal and stowage of drain hoses. In a typical situation, such as that illustrated in FIG. 1, an RV 100 can be connected to an underground sewer inlet fixture or fitting 102 with a drain hose 104. Once the RV 100 is connected to the fitting 102 via the drain hose 104, the waste tank of the RV can be drained into the underground sewer through the drain hose 104.

After the waste tank is emptied, the drain hose 104 can be disconnected from the fitting 102 and the RV 100. The drain hose 104 can thereafter be washed and sanitized in an effort to remove waste and contaminants therefrom. Typically, the process for washing a drain hose 104 includes spraying off the outside and the inside of the drain hose 104 with a hose. The process of washing and sanitizing the drain hose 104 can be unpleasant, messy, and potentially hazardous due to exposure to raw waste. Additionally, because drain hoses are typically corrugated, it can be difficult or impossible to ensure that all raw waste is cleaned from the drain hose 104.

Figure 2:
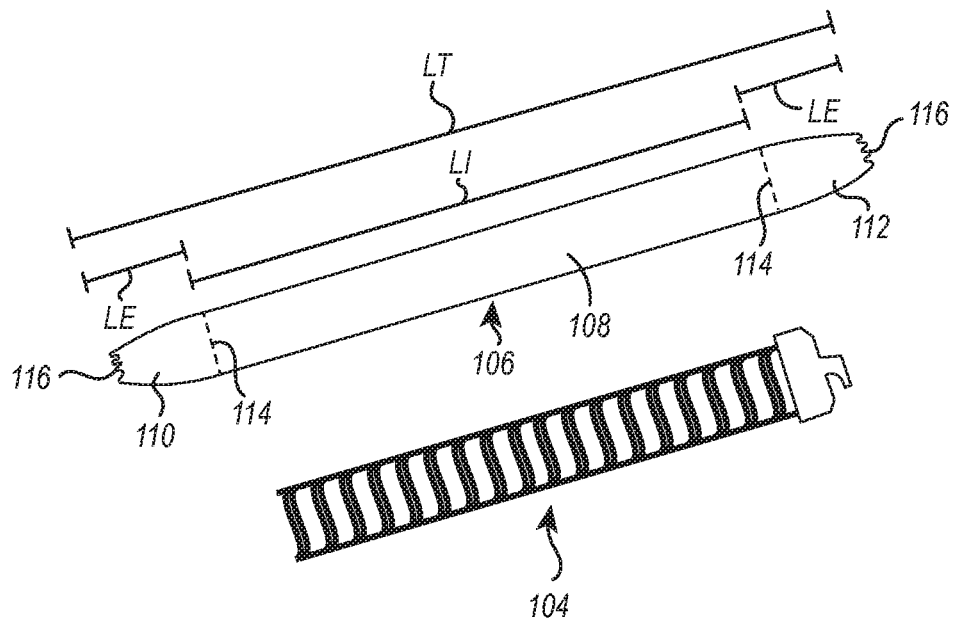
FIG. 2 illustrates a sewage or drain hose for use in the drain system of FIG. 1 and a hose liner for use with the drain hose.

To avoid the discomforts and potential hazards associated with trying to clean the drain hose 104, a liner 106 according to the present disclosure may be used in connection with the drain hose 104. FIG. 2 illustrates the drain hose 104 and a liner 106. As can be seen in FIG. 2, the liner 106 has a total length LT that is longer than a length of the drain hose 104. In the illustrated embodiment, the liner 106 includes an intermediate section 108, a first end section 110, and a second end section 112. The liner 106 may have a conduit or passageway extending therethrough and which opens at opposing ends of the liner 106.

Figure 3:
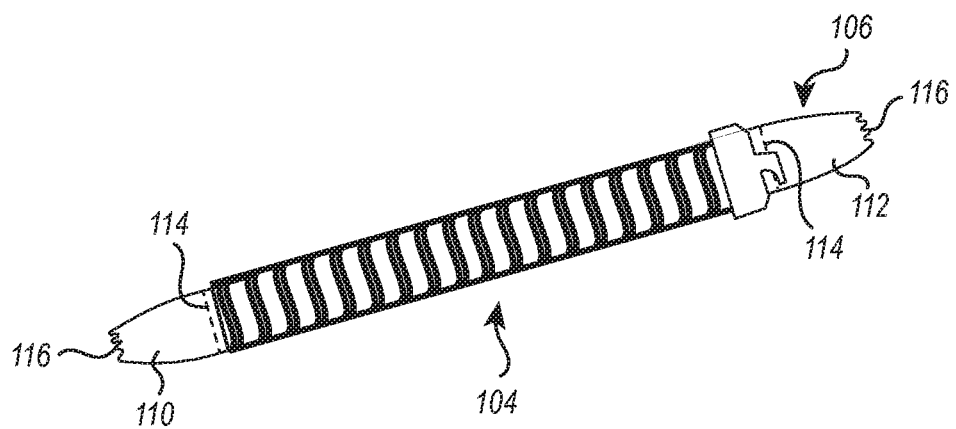
FIG. 3 illustrates the hose liner positioned within the sewage or drain hose of FIG. 2.

The intermediate section 108 may have a length LI that is generally equal to or greater than the length of the drain hose 104. In some embodiments, the drain hose 104 can vary in length (e.g., through expansion and contraction). In such cases, the length LI of the intermediate section 108 may be equal to or greater than the length of the drain hose 104 in a most extended state. In any case, the length LI of the intermediate section 108 may be long enough to span the length of the drain hose 104 and enable the first end section 110 and the second end section 112 to extend from opposing ends of the drain hose 104 when the liner 106 is disposed within the drain hose 104 (as illustrated in FIG. 3). Additionally, the liner 106 or the intermediate section 108 thereof may have a diameter or other cross-sectional dimension that is generally equal to or smaller than a diameter or cross-sectional dimension of the drain hose 104 to enable the intermediate section 108 to fit through the drain hose 104 as shown in FIG. 3.

Each of the first and second end sections 110, 112 may have a length LE extending from the opposing ends of the intermediate section 108. As discussed below, the lengths LE of the first and second end sections 110, 112 may be sufficiently long to enable the end sections 110, 112 to be secured on the opposing ends of the drain hose 104 and, after removal of the liner 106 from the drain hose 104, to be closed, thereby sealing off an interior of the liner 106. As also discussed in greater detail below, an indicator 114 may be disposed at the transitions between the intermediate section 108 and the first and second end sections 110, 112. Furthermore, as discussed in greater detail below, the first and second end sections 110, 112 may include a securing mechanism 116 (e.g., disposed adjacent to or around the openings in the opposing ends of the liner 106) to help secure the liner 106 to the drain hose 104 and optionally close the ends of the liner 106 after use.

Figure 4:
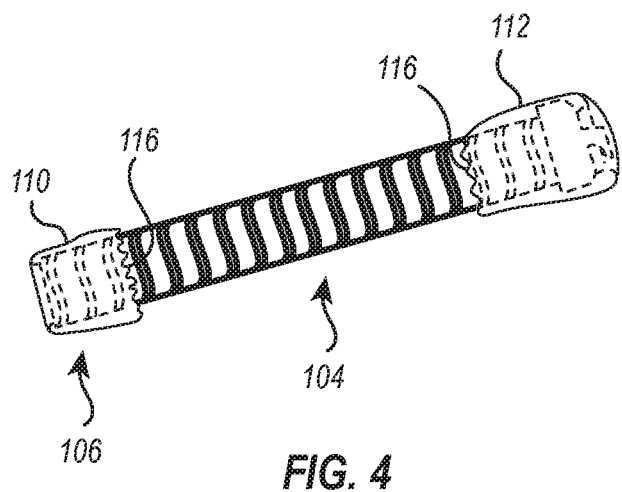
FIG. 4 illustrates ends of a hose liner inverted and secured to a sewage or drain hose.
Figure 5:
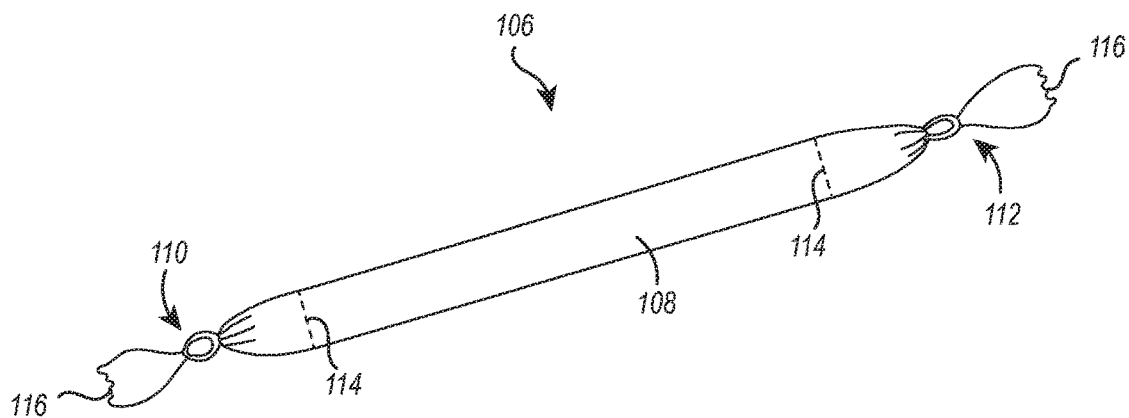
FIG. 5 illustrates a hose liner removed from a sewage or drain hose and sealed at each end.

Turning attention now to FIGS. 3-5, additional aspects regarding the liner 106 and its use will be described in greater detail. As shown in FIG. 3, prior to connecting the drain hose 104 to the RV 100 or the sewer fitting 102, the liner 106 may be disposed within the drain hose 104, such that the first and second end sections 110, 112 extend out of opposing ends of the drain hose 104. In cases where the drain hose includes externally perceivable indicators 114, the liner 106 may be fed through the drain hose 104 until the indicators 114 are perceivable outside opposing ends of the drain hose 104, as shown in FIG. 3. The indicators 114 may be used to ensure that the liner 106 is properly positioned within the drain hose 104.

In some embodiments, one or both ends of the liner 106 may include a weighted element to facilitate feeding of the liner 106 through the drain hose 104. For instance, the liner 106 may include a ring or one or more discrete elements disposed adjacent to one end of the liner 106. The weighted element may be formed of plastic, metal, or other material that is heavier than the material used to form the majority of the liner 106. In some embodiments, the weighted element may be disposed adjacent to an indicator 114, while in other embodiments, the weighted element may be an indicator 114. In any event, the weighted element may increase the weight of one end of the liner 106 to facilitate that end of the liner 106 to pass through the drain hose 104 more easily (e.g., under the force of gravity).

Once the liner 106 is positioned within the drain hose 104, the first and second end sections 110, 112 may be inverted or folded back over or onto the ends of the drain hose 104. For example, as shown in FIG. 4, the first end section 110 is inverted or folded back onto or over one end of the drain hose 104 and the second end section 112 is inverted or folded back onto or over the opposite end of the drain hose 104. In this way, the intermediate section 108 of the liner 106 is disposed within the drain hose 104 and the first and second end sections 110, 112 are disposed on an exterior surface of the drain hose 104. Folding the first and second end sections 110, 112 back onto or over the opposite ends of the drain hose 104 can help secure the liner 106 in place relative to the drain hose 104.

As described above, indicators 114 may be included on the liner 106 to facilitate proper positioning of the liner 106 within the drain hose 104. As shown and described in connection with FIG. 3, the indicators 114 may be on an exterior surface of the liner 104 so that the indicators 114 may be perceived when the liner 106 has been passed through the drain hose 104 but prior to folding the first and second end sections 110, 112 over the ends of the drain hose 104. In other embodiments, the indicators 114 may be perceived only after the first or second end section 110, 112 have been folded over the ends of the drain hose 104. For instance, the indicators 114 may be disposed on an interior surface of the liner 114 and are thereby only revealed when the first and second end sections 110, 112 are folded back. In still other embodiments, the indicators 114 may be perceived both on an exterior and an interior surface of the liner 114.

As mentioned above, the first and second end sections 110, 112 may each include a securing mechanism 116. The securing mechanisms 116 may assist with maintaining the liner 106 in a desired position relative to the drain hose 104. For instance once the first and second end sections 110, 112 have been inverted or folded back onto the opposing ends of the drain hose 104 as shown in FIG. 4, the securing mechanisms 116 may hold the first and second end sections 110, 112, and thus the liner 106, in place relative to the drain hose 104. In other words, the securing mechanisms 116 may limit or prevent the liner 106 from shifting axially relative to the drain hose 114.

The securing mechanisms 116 may take any of a variety of forms. For instance, the securing mechanisms 116 may include elastic members associated with the openings in the ends of the liner 106. The elastic members may constrict the openings in the ends of the liner 106 to a diameter that is smaller than the diameter of the intermediate section 108 or the diameter of the drain hose 104. When the liner 106 is associated with the drain hose 104 as shown in FIG. 4, the elastic member securing mechanisms 116 may be stretched around the outer surface of the drain hose 104 to hold the ends of the liner 106 in place relative to the drain hose 104. In other embodiments, the securing mechanisms may include drawstrings, belt clamps, adhesives, ties, or any other suitable mechanism for securing the ends of the liner 106 in place around the exterior of the drain hose 104.

With the liner 106 positioned as shown in FIG. 4, the liner 106 protects the drain hose 104 from exposure to waste that may pass therethrough. For instance, the ends of the drain hose 104 that connect to the RV 100 and the sewer inlet 102 are covered by the first and second end sections 110, 112 of the liner 106 so that the drain hose 104 does not make direct contact with the RV connection or the sewer inlet 102 or any waste or other contaminates associated therewith. Additionally the intermediate section 108 lines the interior of the drain hose 104 so that any waste that is passed from the RV 100 to the sewer inlet 112 flows through the intermediate section 108 and does not make direct contact with the interior of the drain hose 104.

Once all of the waste has been drained from the RV 100, the drain hose 104 can be disconnected from the RV 100 and the sewer inlet 102. Rather than having to wash and disinfect the drain hose 104, the liner 106 can simply be removed from the drain hose 104 and discarded. Because the liner 106 acts as a barrier between the waste and the drain hose 104, the drain hose 104 is not contaminated by the waste and therefore does not need to be washed or sanitized.

Prior to removing the liner 106 from the drain hose 104 and/or discarding the liner 106, the opposing ends of the liner 106 may be sealed to prevent the escape of any residual waste within the liner 106. For instance, as shown in FIG. 5, a knot may be tide in each of the first and second end sections 110, 112 to close off the ends of the liner 106. In other embodiments, the first and second end sections 110, 112 may be tied together to simultaneously close both of the ends of the liner 106. In still other embodiments, the closure mechanisms 116 may be used to close off the ends of the liner 106. For instance, in cases where the closure mechanisms 116 include drawstrings, the drawstrings may be pulled tight and tide to close the ends of the liner 106. In other embodiments, the closure mechanisms may comprise adhesive strips or tape that may be used to close the ends of the liner 106. In any event, the ends of the liner 106 may be closed to prevent the escape of waste or other contaminants therefrom at least until the liner 106 is properly disposed of.

Figure 6:
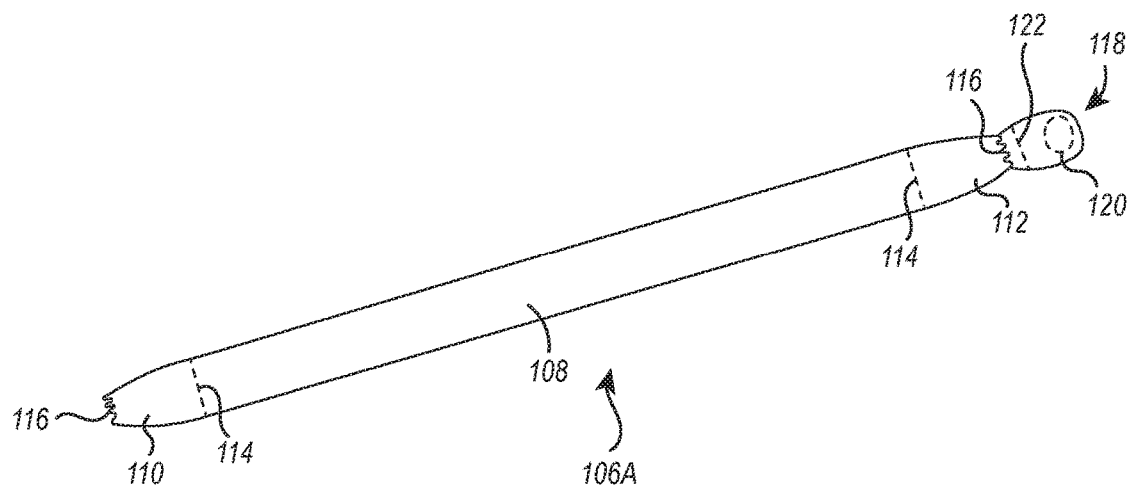
FIG. 6 illustrates another embodiment of a hose liner for use with the drain hose of FIG. 2.

Attention is now direction to FIG. 6, which illustrates another embodiment of a liner 106A that may be used to line the drain hose 104. Liner 106A can be similar or identical to the liner 106 in many respects. For instance, the liner 106A includes an intermediate section 108, a first end section 110, and a second end section 112. The liner 106 also has a conduit or passageway extending therethrough. The liner 106A may also include indicators 114 and securing mechanisms 116 similar or identical to the liner 106.

Unlike the liner 106, the liner 106A includes a closed off end that may be selectively opened or removed to allow waste to flow therethrough. For example, as shown in FIG. 6, the terminal end 118 of the second end section 112 is closed off. With the terminal end 118 being closed off, a weighted element 120 may be disposed therein to facilitate feeding of the liner 106A through the drain hose 104. For instance, the weighted element 120 may be inserted through the first end section 110 and the intermediate section 108 and into the second end section 112 (or the terminal end 118 thereof). The weighted element 120 may be formed of a material that is heavier than the material used to form the majority of the liner 106A. The weighted element 120 may increase the weight of one end of the liner 106A to enable that end of the liner 106A to pass more easily through the drain hose 104 (e.g., under the force of gravity).

Once the liner 106 is positioned within the drain hose 104 (similar to FIG. 3), the terminal end 118 may be opened or removed from the liner 106A to remove the weighted element 120 and open the end of the liner 106A. In some embodiments, the terminal end 120 may be cut open or cut off (e.g., adjacent the securing mechanism 116). In other embodiments, the terminal end 118 may include a perforation 122 formed therein to allow the terminal end 118 to be readily torn away from the rest of the liner 106A. With the terminal end 118 opened or removed, the liner 106A can be used in the same manner as described in connection with the liner 106.

The liners described herein may be formed of or coated or treated with a variety of water resistant or repellant materials, such as plastics, rubber, polyvinyl chloride (PVC), polyurethane (YU), silicone elastomer, fluoropolymers, and wax. Furthermore, the liners described herein may be manufactured for single or one-time use.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of disposing of waste through a drain hose, comprising:
    providing a drain hose having a first end with an opening therein, a second end with an opening therein, and a passageway extending therethrough between the first and second ends;
    providing a liner comprising:
        an intermediate section having a length that is generally equal to or greater than a length of the passageway of the drain hose,
        a first end section extending from a first end of the intermediate section, the first end section having an opening and a securing mechanism integrally associated with first end section and around the opening thereof, and
        a second end section extending from a second end of the intermediate section, the second end section having a securing mechanism integrally associated with the second end section and extending circumferentially therearound, the second end section further comprising a closed terminal end;
    inserting the liner through the drain hose such that the intermediate section is disposed within the passageway and the first and second end sections extend from the openings in the drain hose, inserting the liner through the drain hose comprising inserting a weighted element within the closed terminal end, passing the closed terminal end and the weighted element through the drain hose, detaching or opening the closed terminal end, and removing the weighted element;
    inverting or folding the first and second end sections back over the first and second ends of the drain hose; and
    securing the first and second end sections to an exterior surface of the drain hose with the integrally associated securing mechanism.

2. The method as in claim 1, further comprising passing waste through the liner such that the waste does not directly contact the drain hose.

3. The method as in claim 2, further comprising unfolding the first and second ends and removing the liner from the drain hose.

4. The method as in claim 3, further comprising sealing the first and second ends of the liner to contain any residual waste therein.

5. The method as in claim 4, wherein sealing the first and second ends of the liner comprises tying a knot in each of the first and second end sections.

6. The method as in claim 1, wherein detaching or opening the closed terminal end comprises separating the terminal end from the rest of the liner at a perforation therebetween or opening the terminal end at a perforation in the second end section.

7. The method as in claim 1, wherein the liner further comprises an indicator disposed at a junction between the intermediate section and the first end section, the indicator extending circumferentially about the liner, wherein inserting the liner through the drain hose such that the intermediate section is disposed within the passageway and the first and second end sections extend from the openings in the drain hose comprises inserting the liner until the indicator is aligned with or disposed adjacent to the opening in the first end of the drain.

8. The method as in claim 7, wherein the indicator is perceivable from an exterior of the hose liner.

9. The method as in claim 7, wherein the indicator is perceivable from an interior of the hose liner.

10. The method as in claim 1, wherein the indicator is perceivable from an exterior of the hose liner.

11. The method as in claim 1, wherein the indicator is perceivable from an interior of the hose liner.

12. The method as in claim 1, wherein the liner further comprises an indicator disposed at a junction between the intermediate section and the second end section, the indicator extending circumferentially about the liner, wherein inserting the liner through the drain hose such that the intermediate section is disposed within the passageway and the first and second end sections extend from the openings in the drain hose comprises inserting the liner until the indicator is aligned with or disposed adjacent to the opening in the second end of the drain.

13. The method of claim 1, wherein the integrally associated securing mechanism comprises a drawstring, an adhesive, tape, a tie, or combinations thereof, and wherein securing the first and second end sections to an exterior surface of the drain hose comprises pulling on the drawstring, tying the tie around the hose liner and the drain hose, applying adhesive or tape to the hose liner and the drain hose, or combinations thereof.

14. A method of disposing of waste through a drain hose, comprising:
    providing a drain hose having a first end with an opening therein, a second end with an opening therein, and a passageway extending therethrough between the first and second ends;
    providing a liner comprising:
        an intermediate section having a length that is generally equal to or greater than a length of the passageway of the drain hose,
        a first end section extending from a first end of the intermediate section, the first end section having an opening and a securing mechanism integrally associated with first end section and around the opening thereof, and
        a second end section extending from a second end of the intermediate section, the second end section having a securing mechanism integrally associated with the second end section and extending circumferentially therearound, the second end section further comprising a closed terminal end;
    inserting the liner through the drain hose such that the intermediate section is disposed within the passageway and the first and second end sections extend from the openings in the drain hose, wherein inserting the liner through the drain hose comprises inserting a weighted element within the closed terminal end, passing the closed terminal end and the weighted element through the drain hose, detaching or opening the closed terminal end, and removing the weighted element, wherein detaching or opening the closed terminal end comprises separating the terminal end from the rest of the liner at a perforation therebetween or opening the terminal end at a perforation in the second end section;

inverting or folding the first and second end sections back over the first and second ends of the drain hose; and securing the first and second end sections to an exterior surface of the drain hose with the integrally associated securing mechanisms.

15. The method as in claim 14, wherein the liner further comprises one or more visual indicators between the intermediate section and the first end section or between the intermediate section and the second end section, the one or more visual indicators extending circumferentially about the liner and configured to provide an indication of the proper positioning of the liner along the length of the hose, wherein inserting the liner through the drain hose comprises inserting the liner until the one or more visual indicators are aligned with or disposed adjacent to the opening in the first end of the drain or the second end of the drain.

16. The method as in claim 14, further comprising viewing the one or more visual indicators on an exterior surface of the liner or on an interior surface of the liner.

17. The method as in claim 16, wherein inverting or folding the first and second end sections back over the first and second ends of the drain hose comprises inverting or folds the first and second end sections until the one or more visual indicators are visible on the interior surface of the liner.

18. The method as in claim 14, further comprising:
passing waste through the liner such that the waste does not directly contact the drain hose;
unsecuring the first and second ends of the liner from the drain hose;
sealing the first and second ends of the liner to contain any residual waste therein; and
removing the liner from the drain hose.

19. The method as in claim 18, wherein the first end of the liner is unsecured from the drain hose and sealed and then either:
the second end of the liner is unsecured from the drain hose and sealed and then the liner is removed from the drain hose; or
then the second end of the liner is unsecured from the drain hose, the liner is then removed from the drain hose, and then the second end of the liner is sealed.

20. The method as in claim 14, wherein the integrally associated securing mechanism comprises a drawstring, an adhesive, tape, a tie, or combinations thereof, and wherein securing the first and second end sections to an exterior surface of the drain hose comprises pulling on the drawstring, tying the tie around the hose liner and the drain hose, applying adhesive or tape to the hose liner and the drain hose, or combinations thereof.

* * * * *